United States Patent [19]
Mizuno et al.

[11] Patent Number: 5,542,297
[45] Date of Patent: Aug. 6, 1996

[54] ACCELERATION SENSOR

[75] Inventors: Jun Mizuno; Kay Nottmeyer, both of Higashi-Matsuyama; Mitsuteru Kimura, Shichigahama-Machi, all of Japan

[73] Assignee: Zexel Corporation, Tokyo, Japan

[21] Appl. No.: 451,163

[22] Filed: May 26, 1995

[30] Foreign Application Priority Data

Jun. 1, 1994 [JP] Japan .................................. 6-140698

[51] Int. Cl.⁶ ...................................................... G01P 15/00
[52] U.S. Cl. .................................. 73/514.36; 73/514.33; 73/514.34
[58] Field of Search ......................... 73/514.36, 514.37, 73/514.38, 514.21, 514.34, 514.23, 514.29, 514.33; 310/323, 329

[56] References Cited

U.S. PATENT DOCUMENTS

| | | | |
|---|---|---|---|
| 2,258,613 | 10/1941 | Kannenstine et al. | 73/514.38 |
| 4,969,359 | 11/1990 | Mikkor | 73/514.36 |
| 5,081,867 | 1/1992 | Yamada | 73/514.38 |
| 5,228,341 | 7/1993 | Tsuchitani et al. | 73/514.36 |

*Primary Examiner*—Hezron E. Williams
*Assistant Examiner*—Richard A. Moller
*Attorney, Agent, or Firm*—Wenderoth, Lind & Ponack

[57] ABSTRACT

In the sensor including a frame member provided with a central opening portion, a pair of beam members extending from adjacent corner portions of the frame member toward a center of the opening portion, and the beam members have vibrating-end portions, i.e., inner end portions, connected with each other through a weight portion. Each of the beam members is provided with a concave portion in cross section. A piezo-resistance device is formed on each of the beam members, respectively. The beam members are improved in mechanical strength without a corresponding increase in a thickness of each of the beam members, while the piezo-resistance devices formed on the beam members are improved in sensitivity to vibrations.

14 Claims, 6 Drawing Sheets

FIG.11

ACCELERATION SENSOR

BACKGROUND OF THE INVENTION

1. Field of the Invention

The present invention relates to an acceleration sensor for detecting an acceleration of a vehicle and the like, and more particularly to improvements of the acceleration sensor both in mechanical strength and sensitivity thereof.

2. Description of the Prior Art

An acceleration sensor is used for the purpose of detecting an acceleration caused by an impact (or centrifugal force) of colliding vehicles. The detected acceleration is used to control the operation of a suitable system, for example such as an air bag system and the like. In a typical one of conventional acceleration sensors of this type, a piezo-resistance device is mounted on a cantilever member of the sensor. When the sensor is subjected to acceleration, the cantilever member deflects due to such acceleration, thereby causing a change in the resistance value of the piezo-resistance device. The change enables the sensor to detect the acceleration. In other words, for example, disclosed in Japanese Patent Laid-Open No. Hei 5-281251 is an example of a four-sided beam type acceleration sensor, in which example: a square frame formed from a silicon plate has a beam member extending from each side toward a center of the frame and connected with a center weight portion thereof; and, a piezo-resistance device is formed in a surface of each of the beam members through impurity-diffusion processes.

When the acceleration sensor as described above is subjected to acceleration, resistance values of the piezo-resistance devices vary in response to strains caused in the devices by the deflections of the beam members which enable the sensor to detect the acceleration.

However, in the above-mentioned conventional acceleration sensor, since the strains of the piezo-resistance devices are caused by the deflections of the beam members, sensitivity of the sensor depends substantially exclusively on flexibility of each of the beam members with respect to acceleration. In other words, in order to improve the sensitivity of the acceleration sensor, it is necessary to reduce each of the beam members in thickness, thereby improving the beam members in flexibility. The beam members thus improved in flexibility may sufficiently deflect even when the sensor is subjected to a minute acceleration, which enables the piezo-resistance devices of the beam members to have resistance values change without fail. In this case, since the beam members are reduced in thickness, the sensor is poor in mechanical strength. This is a problem inherent in the conventional acceleration sensor.

SUMMARY OF THE INVENTION

It is an object of the present invention to provide an acceleration sensor excellent both in sensitivity and mechanical strength thereof.

It is another object of the present invention to provide an acceleration sensor having a simple construction for detecting, in addition to a one-dimensional acceleration, a two-dimensional acceleration such as an acceleration in rotational motion both in magnitude and direction.

It is a further object of the present invention to provide an acceleration sensor having beam members which are thin and excellent in mechanical strength.

The above objects of the present invention are accomplished by providing:

In an acceleration sensor including: a detecting device for detecting vibrations; and a cantilever means for carrying the detecting device, the cantilever means being provided with a weight means at a vibrating-end portion, wherein the improvement includes: the cantilever member having a supported-end portion larger in width than the other portion thereof; and a support means for supporting the supported-end portion of the cantilever means is provided with a compensating device having the same construction as that of the detecting device.

In the present invention, the cantilever means, on which the detecting device for detecting vibrations is mounted, is provided with the supported-end portion which is larger in width than the other portion of the detecting device and connected with the support means, and, therefore the cantilever means is excellent in durability with respect to vibrations caused in the supported-end portion thereof. Because of this durability, the acceleration sensor of the present invention is a foolproof one and excellent in reliability. Further, since the sensor of the present invention is provided with the compensating device having the same construction as that of the detecting device, any separate-type compensating device to be provided in an external circuit is not required in the present invention. Further, in the sensor of the present invention, since the compensating device has the same construction as that of the detecting device, the compensating device is substantially the same in output characteristics as the detecting device, which enables the sensor of the present invention to realize substantially full compensation adequate for output signals issued from the detecting device.

DESCRIPTION OF THE PREFERRED EMBODIMENTS

Hereinbelow, the present invention will be described in detail with reference to the accompanying drawings, in which it will be understood by those skilled in the art that many changes and modifications may be made without departing from the spirit and scope of the present invention.

Figure 1:
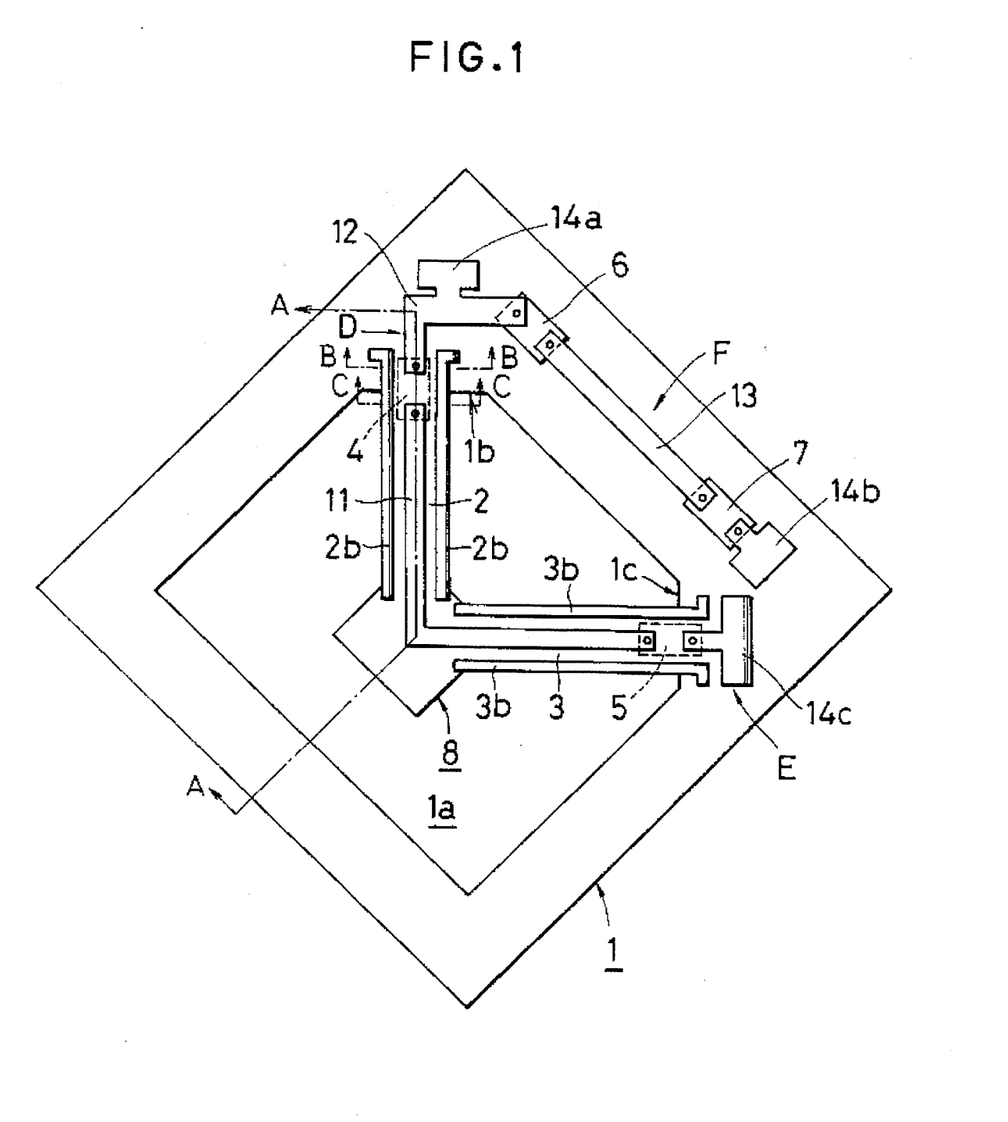
FIG. 1 is a plan view of a first embodiment of the acceleration sensor of the present invention.

Referring first to FIG. 1, an acceleration sensor of the present invention is of a so-called cantilever-type having a construction in which: a frame member 1 is provided with a pair of beam members 2, 3 each of which forms a cantilever: a first piezo-resistance device 4 and a second piezo-resistance device 5 both for detecting vibrations are formed on the beam members 2 and 3, respectively; formed in both vibrating-end portions of the beam members 2, 3 is mass or weight portion 8; and, formed on a side of the frame member 1 is a pair of piezo-resistance devices 6, 7 for compensation.

Figure 2:
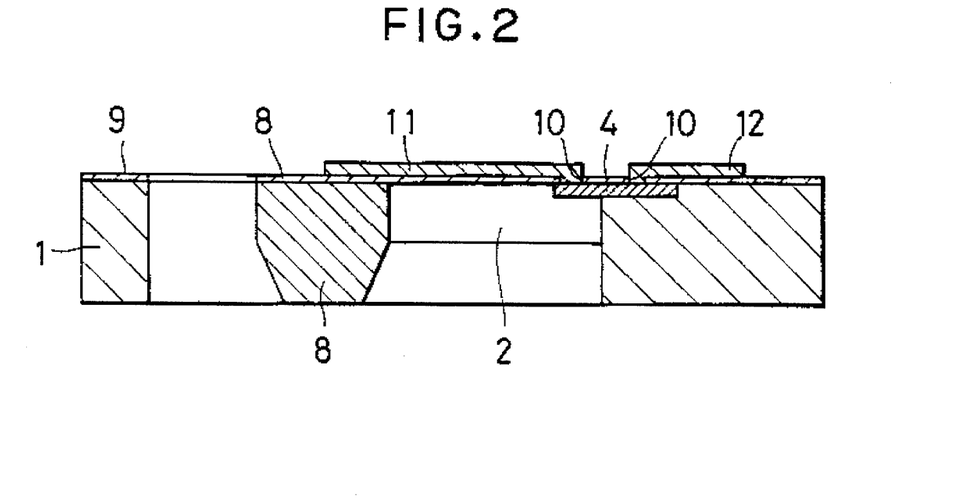
FIG. 2 is a cross-sectional view of the sensor of the present invention, taken along the line A—A of FIG. 1.

In other words, the frame member 1, which is formed of Si (100), assumes a substantially flat square shape. As shown in FIG. 2, a SiOxNy film 9 having a thickness of about 2 microns is formed on an upper surface face of the frame member 1 through appropriate processes such as a so-called CVD process. A preferable thickness (i.e., height shown in FIG. 2) of the frame member 1 approximately 500 microns.

In the first embodiment of the present invention, the frame member 1 is provided with an opening portion 1a which is formed along a side oppositely disposed from a side F of the frame member 1. Extended toward the center of the frame member 1 from opposite corner portions 1b, 1c of the side F are the beam members 2, 3 on which the SiOxNy film 9 is formed, as shown in FIGS. 1 and 5. The beam members 2 and 3 are provided with concave portions 2a and 3a, respectively. As is clear from FIGS. 1 and 4, substantially square-shaped horizontal flanges 2b and 3b extend outward from opposite ends of the concave portions 2a and 3a, respectively.

Each of supported-end portions of the beam members 2, 3 is integrally formed with the SiOxNy film 9 which is formed in the upper surface of the frame member 1 as described above. Each of the other end portions, i.e., vibrating-end portions of the beam members 2, 3 extend toward a center of the opening portion 1a of the frame member 1 and are connected with a weight portion 8 an upper surface of which 8a is integrally formed with those of the beam members 2, 3. In other words, as shown in FIGS. 2 and 5, the vibrating-end portions of the beam members 2, 3 are connected with each other through the upper surface 8b of the weight portion 8.

As is clear from FIGS. 1 and 5, the flanges 2b, 3b of the beam members 2, 3 extend outward at right angles to form bent portions in the corresponding supported-end portions of the beam members 2, 3. The frame member 1 is provided with a plurality of notch portions 1d corresponding in position to such bent portions of the flanges 2b, 3b of the beam members 2, 3. In these notch portions 1d, the SiOxNy film 9 formed in the upper surface of the frame member 1 extends on the flanges 2b, 3b to cover their side walls, and, therefore is connected with these flanges 2b, 3b.

In the embodiment of the present invention, though the pair of the beam members 2, 3 have their front-end or vibrating-end portions connected with each other to form a kind of two-legged cantilever, it is also possible to replace these beam members 2, 3 with a single cantilever member. In other words, such single cantilever member may be provided with a triangular opening in its central portion and have its supported-end portion be wider than its front-end or vibrating-end portion. In this case, such triangular opening corresponds to an opening surrounded by the beam members 2, 3 and the side F of the frame member 1 in the first embodiment, of the present invention shown in FIG. 1.

Consequently, in effect, such corresponding opening of the frame member 1 defines the pair of the beam members 2, 3. As described above, in case that the supported-end portion of the cantilever member constructed of the pair of the beam members 2, 3 is wider than its front-end or vibrating-end portion, such cantilever is hard to twist when subjected to vibrations. Consequently, the piezo-resistance devices 4, 5, which are formed in the supported-end portion of the cantilever member constructed of the beam members 2, 3, are so arranged as to be subjected to the substantially same deformation.

As described above the weight portion 8 is so arranged as to connect the vibrating-end portions of the beam members 2, 3 with each other. In the first embodiment of the present invention, the weight portion 8 is constructed of a body portion 8a made of silicon and its upper surface 8b (shown in FIG. 2) made of the SiOxNy film 9. In operation, when the acceleration sensor of the present invention is subjected to acceleration, the weight portion 8 moves to cause deflections of the beam members 2, 3. For example, the acceleration sensor of the present invention is subjected to a vertical acceleration in a condition shown in FIG. 2, the weight portion 8 is moved by a force a magnitude of which is the product of a mass of the weight portion 8 and the acceleration, thereby causing deflections of the beam members 2, 3.

Figure 3:
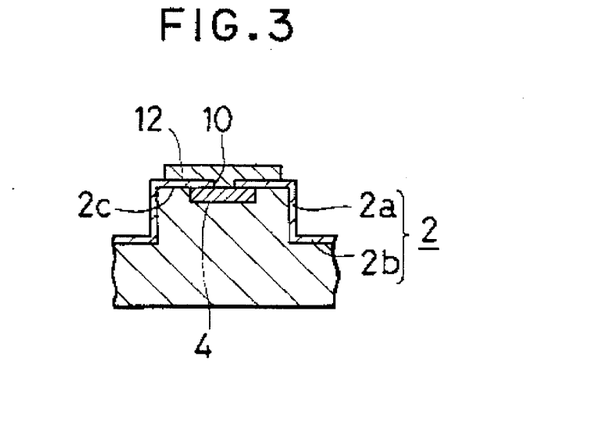
FIG. 3 is a cross-sectional view of the sensor of the present invention, taken along the line B—B of FIG. 1.
Figure 4:
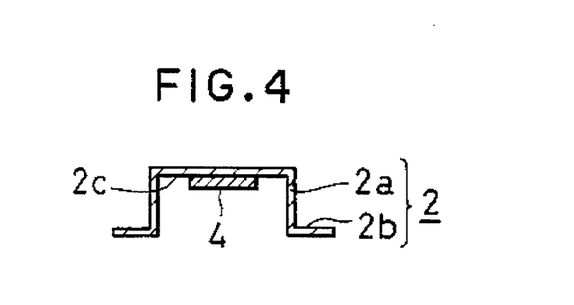
FIG. 4 is a cross-sectional view of the sensor of the present invention taken along the line C—C of FIG. 1.
Figure 5:
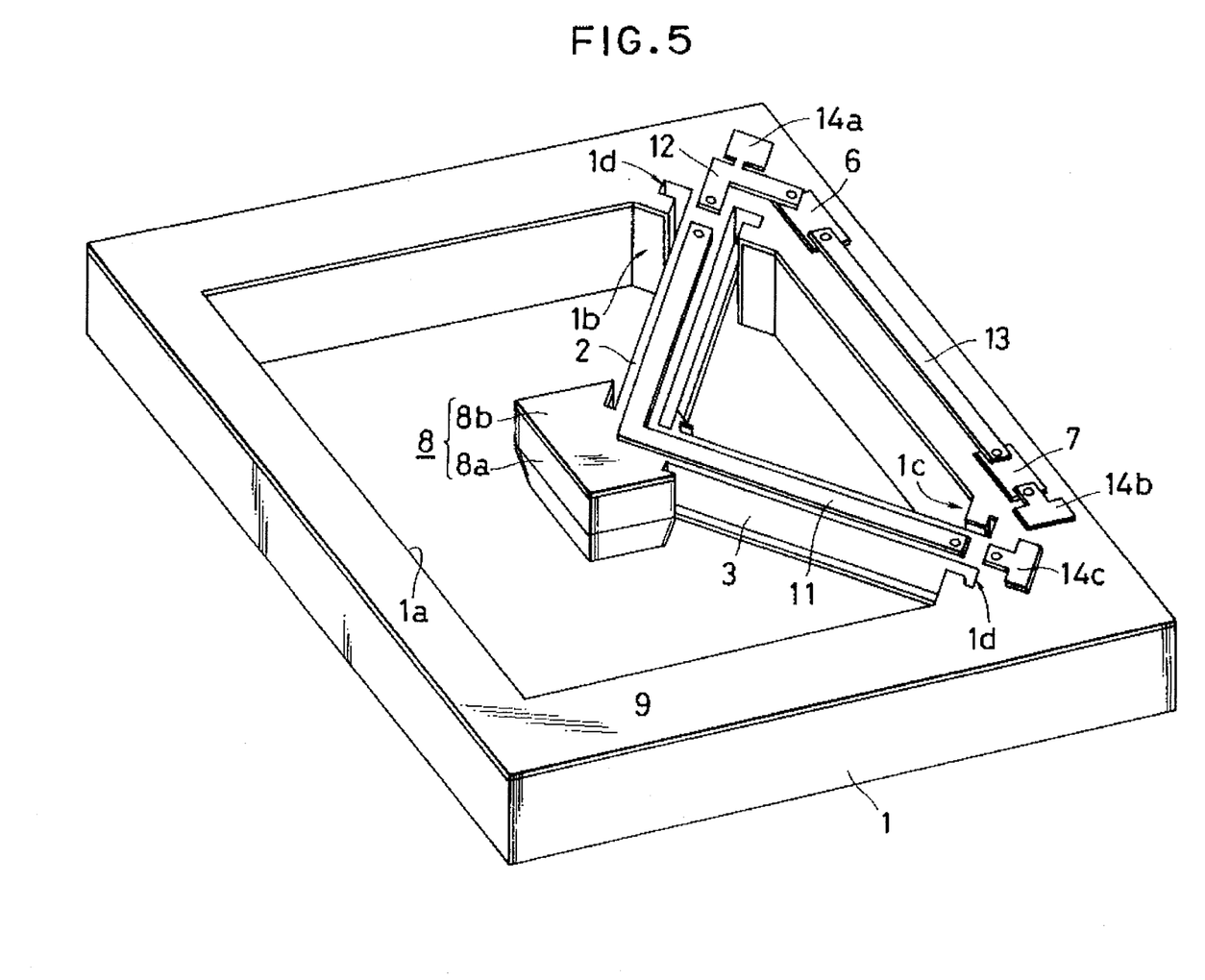
FIG. 5 is a perspective view of the first embodiment of the present invention shown in FIG. 1.

On the other hand, as shown in FIGS. 2, 3 and 4, formed respectively by using boron-added (i.e., boron-implanted) silicon in both bottom surfaces 2c, 3c of the concave portions 2a, 3a proximate to the supported-end portions of the beam members 2, 3 are first piezo-resistance device 4 and a second piezo-resistance device 5 each of which extends in the longitudinal direction of each of the beam members 2, 3 and has a thickness of, for example, approximately 1 micron. As is clear from FIG. 2, in the embodiment of the present invention, each of the first and the second piezo-resistance devices 4, 5 is formed in each of the bottom surfaces 2c, 3c of the beam members 2, 3 so as to extend from a position outside the frame member 1 into a position between: the bottom of the SiOxNy film 9 disposed the upper surface of the frame member 1; and, the frame member 1. Incidentally, the amount of boron to be implanted in silicon for fabricating the first and the second piezo-resistance devices 4, 5 is preferably, for example, at least $2 \times 10^{19}$ cm$^{-3}$. In effect, such high concentration of boron having been implanted in silicon prevents the thus fabricated boron-implanted silicon from being etched even when the boron-implanted silicon is subjected to anisotropic etchants such as potassium hydroxide (KOH) and the like.

As is clear from FIGS. 2 and 3, a contact hole 10 is formed in each of the upper surfaces of the beam members 2, 3 in the vicinities of the opposite ends of each of the first and the second piezo-resistance devices 4, 5 as viewed in FIG. 2. As for the frame member 1 shown in FIG. 2, through an inner contact hole 10, the first and the second piezo-resistance devices 4, 5 are connected with a first conductor 11. Further as is clear from FIG. 1, the first piezo-resistance device 4 is connected with a second conductor 12 through an outer contact holes 10. And, the second piezo-resistance device 5 is connected with a third contact pad 14c through an outer contact holes 10.

The first conductor 11, which is connected with each of the inner end portions of the first and the second piezo-resistance devices 4 and 5, is formed on the upper surfaces of the beam members 2, 3. In other words, as shown in FIGS. 2 and 3, the first conductor 11 is so arranged as to have one end portion: overlay the inner end portion of the first piezo-resistance device 4 through the beam member 2; and, connect with the same inner end portion through the inner contact hole 10 formed in the upper surface of the beam member 2. As shown in FIG. 1, the first conductor 11 extends along beam member 2 to the weight portion 8, and then extends along beam member 3 forming a substantially right angle.

The other end portion of the first conductor 11 formed in the upper surface of the beam member 3 has the substantially same arrangement as that of the above-mentioned arrangement of the one end portion. Namely, the first conductor 11 has the other end portion thereof: overlay the inner end portion of the second piezo-resistance device 5 through the beam member 3; and, connect with the same inner end portion through the inner contact hole 10 formed in the upper surface of the beam member 3.

In the first embodiment of the present invention, the first conductor 11 has a two-layer construction comprising a chromium layer and a copper layer, in which construction the chromium layer has a thickness of about 0.05 micron and the copper layer about 0.2 micron, both of the layers being formed on the upper surface of the weight portion 8 by using vacuum deposition.

Portions D, E of the frame member 1 form the supported-end portions of the beam members 2, 3. In the portion D, the second conductor 12 is formed on the SiOxNy film 9. As shown is clear from FIGS. 1, 2 and 5, the second conductor 12 has: one end portion connected with the first piezo-resistance device 4 through an outer contact hole 10 formed in the SiOxNy film 9; and, the other end thereof overlays an end portion of a third piezo-resistance device 6 formed on the SiOxNy film 9 and connected therewith.

The second conductor 12 is connected with a first contact pad 14a which is formed on the SiOxNy film 9 in an appropriate position near the second conductor 12 so as to be electrically connected to an external circuit. Incidentally, the second conductor 12 and the first contact pad 14a are preferably made of, for example, aluminum and like conductors, and fabricated through the same processing.

On the other hand, as shown in FIG. 1, in the portion E of the frame member 1, the third contact pad 14c is formed on the SiOxNy film 9. A part of the third contact pad 14c is arranged so as to overlay the outer end portion of the second piezo-resistance device 5 through the SiOxNy film 9, and be connected with the same device 5 through an outer contact hole 10 formed in the SiOxNy film 9.

In the frame member 1 of the first embodiment of the present invention, the side F is disposed between the portions D and E, in which side F a third piezo-resistance device 6; and a fourth piezo-resistance device are formed so as to be spaced apart from each other in the longitudinal direction of the side F and connected with each other through a third conductor 13, as shown in FIGS. 1 and 5.

As in the first and the second piezo-resistance devices 4 and 5, the third and the fourth piezo-resistance devices 6 and 7 of the embodiment of the present invention are made of boron-added or boron-implanted silicon. As is clear from FIGS. 1 and 5, each of the devices 6, 7 extend in the longitudinal direction of the side F of the frame member 1 to assume a square shape having the same size as that of the first or the second piezo-resistance device 4 or 5.

On the other hand, the third conductor 13 has: one of the opposite ends overlay an inner one of opposite ends of the third piezo-resistance device 6; the other end thereof overlay an inner one of opposite ends of the fourth piezo-resistance device 7; and, an intermediate portion thereof formed on the SiOxNy film 9. The third conductor 13 of the embodiment of the present invention has a two-layer construction comprising: a chromium layer having a thickness of about 0.05 micron; and, a gold layer having a thickness of about 0.2 micron.

As shown in FIG. 5, an end portion of the second conductor 12 overlays the other end of the third piezo-resistance device 6. A part of the second contact pad 14b overlays the other end of the fourth piezo-resistance device 7. Incidentally, both the second and the third contact pads 14b, 14c are preferably made of suitable conductors, for example such as aluminum and the like.

Figure 6:
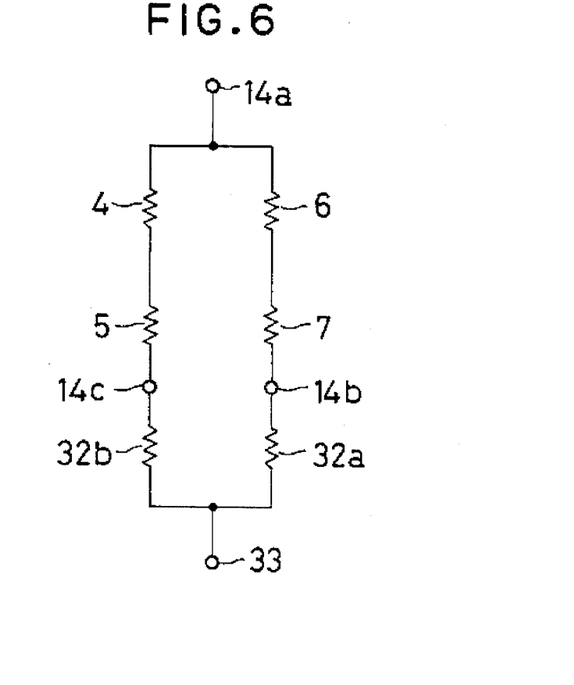
FIG. 6 is an example of a circuit diagram whose characteristics are electrically equivalent to those of the acceleration sensor of the first embodiment of the present invention.

FIG. 6 shows an equivalent circuit whose characteristics are electrically equivalent to those of the acceleration sensor of the first embodiment of the present invention having the above construction.

Now, the equivalent circuit will be described with reference to FIGS. 6 and 7 in connection with an external circuit being connected with the equivalent circuit.

In the equivalent circuit show in FIG. 6, the third and the fourth piezo-resistance devices 6, 7 are connected in series between the first contact pad 14a and the second contact pad 14b.

Further, the first and the second piezo-resistance devices 4, 5 are connected in series between the first contact pad 14a and the third contact pad 14c.

Although neglected in FIG. 1, resistors 32a and 32b are connected with the contact pads 14b and 14c, respectively. These resistors 32a, 32b have the other ends thereof connected with a common terminal 33 through which the equivalent circuit of the present invention is connected to the external circuit.

An output or detection signal of the acceleration sensor of the present invention develops between the contact pad 14a and the terminal 33.

Figure 7:
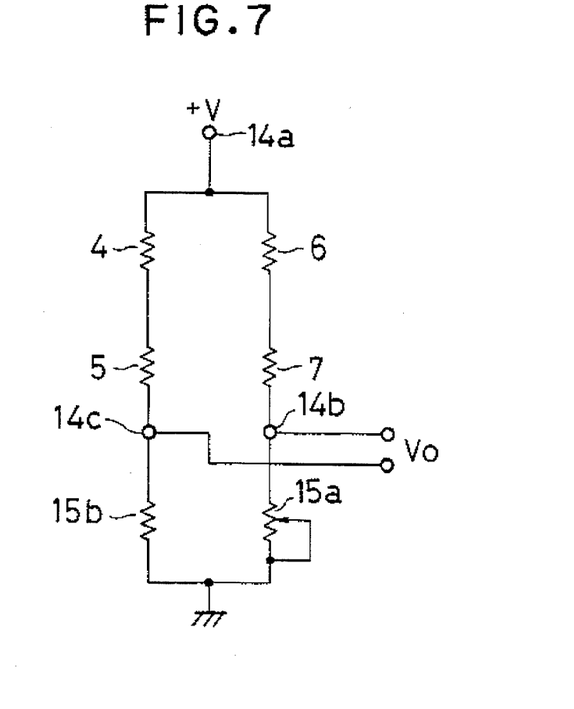
FIG. 7 is another example of the circuit diagram whose characteristics are electrically equivalent to those of the acceleration sensor of the first embodiment of the present invention, illustrating its external connections in practical use.

FIG. 7 shows another embodiment of the equivalent circuit of the acceleration sensor of the present invention, in which the external circuit to be connected to the equivalent circuit is neglected. In this embodiment shown in FIG. 7, for example, in use, a DC voltage V is applied is the first contact pad 14a in a condition in which: the second contact pad 14b is connected with an end of a variable resistor 15a; the third contact pad 14c is connected with an end of a fixed resistor 15b; and, the other ends of these resistors 15a, 15b are grounded.

As a result, a detection signal Vo develops between the contact pads 14b and the 14c of the acceleration sensor of the present invention.

Incidentally, the variable resistor 15a is used to control the detection signal in its output level.

In operation, the acceleration sensor of the present invention acts as follows.

For example, in use, when the sensor of the present invention is subjected to an acceleration in a direction perpendicular to the plane of the paper showing FIG. 1, the weight portion 8 of the sensor is subjected to a force having a magnitude corresponding to the product of the mass of the weight portion 8 and the acceleration, thereby moving in a direction determined by the acceleration.

Because of the movement of the weight portion 8, the beam members 2, 3 deflect to cause strains of the first and the second piezo-resistance devices 4, 5, which strains correspond in magnitude to the deflections of the beam members 2, 3. Because of the thus caused strains and the piezo-electric effect, the first and the second piezo-resistance devices 4, 5 vary their resistance values. As a result, for example, in case of the circuit shown in FIG. 7, variations of such resistance values corresponding to the acceleration enable the acceleration sensor of the present invention to issue a detection signal Vo (shown in FIG. 7). The thus obtained detection signal Vo corresponding to the acceleration is used to control an air bag system of a vehicle, for example such as automobiles and the like.

In the acceleration sensor of the embodiments of the present invention, each of the beam members 2, 3 is formed, so as to have a concave portion as viewed in cross section in FIG. 4. In contrast with this, in the conventional acceleration sensor, a beam member is formed into a thin plate member on which the piezo-resistance device is formed. Consequently, the conventional acceleration sensor is poor in mechanical strength while excellent in sensitivity. In this connection, in the acceleration sensor of the embodiments of the present invention, since the beam members 2, 3 have the above construction, in effect, each of the beam members 2, 3 is larger in cross section than the thin plate member of the conventional sensor. Further, in thickness, each of the beam members 2, 3, on which the first and the second piezo-resistance devices 4, 5 are formed, is substantially equal to or smaller than the thin plate member of the conventional sensor, which enables the sensor of the present invention be equal to or greater in sensitivity than the conventional sensor.

Figure 8:
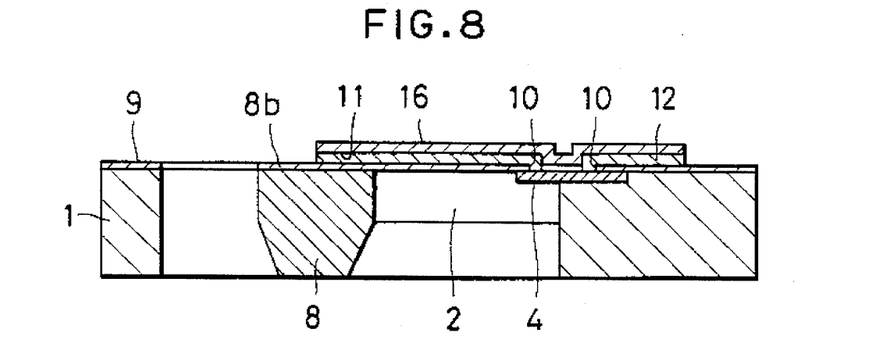
FIG. 8 is a longitudinal sectional view of another embodiment of the beam member of the acceleration sensor of the present invention.
Figure 9:
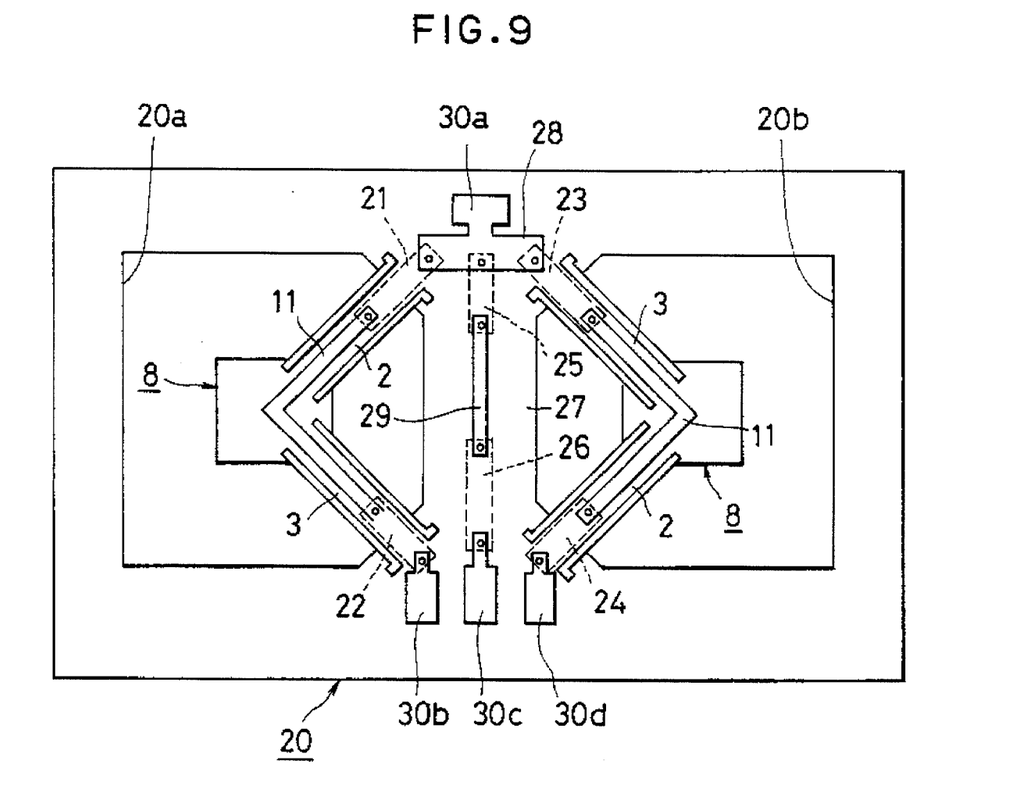
FIG. 9 is a front view of a second embodiment of the acceleration sensor of the present invention.

FIGS. 8 and 9 show a second embodiment of the acceleration sensor of the present invention, in which the first and the second piezo-resistance devices 4, 5 &re further improved in sensitivity to vibrations.

In the second embodiment of the present invention, a thin insulating layer made of insulating material (not shown in FIG. 8) is formed on an upper surface of the first conductor 11 so as to extend from the vicinity of the weight portion 8 to the vicinity of the bent portion of the second conductor 12, the bent portion being bent at substantially right angles. Formed on the insulating layer is a conductor-plated layer 16, preferably a copper-plated layer 16.

Since such conductor-plated layer 16 is easy to vibrate, it is possible to transmit the vibrations to the first and the second piezo-resistance devices 4, 5 with the highest certainty by forming the conductor-plated layer 16 on the first and the second piezo-resistance devices 4, 5, which improves the sensitivity of the sensor of the present invention.

Now, the second embodiment of the sensor of the present invention will be described with reference to FIG. 9. Incidentally, in FIG. 9, the parts which are the same as the ones shown in FIGS. 1 to 7 have been given the same reference numerals and characters, and, therefore are not further explained here. The remaining parts of the second embodiment of the present invention, which are different from ones shown in FIGS. 1 to 7, will be described hereinbelow.

In general, the acceleration sensor of this second embodiment of the present invention has a construction in which a pair of the acceleration sensors of the first embodiment of the present invention are symmetrically connected with each other through the sides F of the frame members 1 of the first embodiment of the present invention.

In other words, as shown in FIG. 9, a frame member 20 of the acceleration sensor is provided with a pair of opening portions 20a, 20b which are spaced apart from each other in the longitudinal direction of the frame member 20.

In each of the opening portions 20a, 20b, the same beam members 2, 3 as those of the first embodiment are arranged so as to extend toward the center of each of the opening portions 20a, 20b, and have the vibrating-end portions integrally formed with each of the weight portions 8.

The beam members 2, 3 of the second embodiment as shown in FIG. 9 have the same cross-sectional shapes as those of the first embodiment shown in. FIG. 4. Further, as in the first embodiment, a first to a fourth piezo-resistance devices 21 to 24 are formed in the bottom surfaces of the concave portions 2a, 3a of the beam members 2, 3 of the second embodiment.

In the frame member 20 shown in FIG. 9, a central-partition portion 27, 2 through which the opening portions 20a, 20b are separated from each other, has an upper surface on which the SiOxNy film 9 is formed. On the back of film 9 a fifth and a sixth piezo-resistance devices 25 and 26 (shown in dotted lines) are formed so as to be spaced apart from each other in the longitudinal direction of the central-partition portion 27. Incidentally, the first to the sixth piezo-resistance devices 21 to 26 are the same in size and are made of boron-added or boron-implanted silicon, as in the first embodiment shown in FIG. 1. Further, the amount of boron to be added or implanted is the same as in the first embodiment.

In a left half of the frame member 20 shown in FIG. 9, the first conductor 11 is formed on the upper surfaces (i.e., front surfaces as viewed in FIG. 9) of the beam members 2, 3. Connected through the first conductor 11 are an inner one of opposite end portions of the first piezo-resistance device 21 and an inner one of opposite end portions of the second piezo-resistance device 22.

In a right half of the frame member 20 shown in FIG. 9, the first conductor 11 is formed on the upper surfaces (i.e., front surfaces as viewed in FIG. 9) of the beam members 2, 3. Connected through the first conductor 11 are an inner one of opposite end portions of the third piezo-resistance device 23 and an inner one of opposite end portions of the fourth piezo-resistance device 24, Further, the fifth and the sixth piezo-resistance devices 25 and 26 are connected with each other through a third conductor 29 which is formed in the upper surface of the central-partition portion 27 of the frame member 20. Preferably, the first and the third conductors 11 and 29 are made of alloys of chromium and gold.

Incidentally, in the embodiments of the present invention, the first to the fourth piezo-resistance devices 21 to 24 are formed in the bottom surfaces (which correspond to the portion denoted by the reference numeral 2c in the first embodiment shown in FIG. 4) of the beam members 2, 3, as in the first embodiment shown in FIGS. 1 to 7. On the other hand, the fifth and the sixth piezo-resistance devices 25, 26 are formed between the SiOxNy film 9 and the frame member 20. The SiOxNy film 9 is formed on the upper surface (i.e., front surface as viewed in FIG. 9) of the central-partition portion 27 of the frame member 20.

The first, the third and the fifth piezo-resistance devices 21, 23 and 25 have the other end portions thereof connected with the second conductor 28 through contact holes (not shown) formed in the SiOxNy film 9 formed in the upper surface of the frame member 20, as in the first embodiment shown in FIG. 5. As shown in FIG. 9, the second conductor 28 has a longer side portion connected with a first contact pad 30a through which the sensor of the second embodiment of the present invention is connected to an suitable external circuit.

Through corresponding contact holes (which are formed in the SiOxNy film 9 formed in the upper surface of the frame member 20, through not shown in FIG. 9), the second, the fourth and the sixth piezo-resistance devices 22, 24 and 26 have the other end portions thereof connected with a second, a sixth and a fourth contact pads 30b, 30d and 30c, respectively. The sensor of the second embodiment shown in FIG. 9 may be connected with a suitable external circuit through these contact pads 30b, 30c and 30d.

In this second embodiment of the present invention: of the piezo-resistance devices 21 to 26, the first to the fourth ones 21 to 24 are used for detecting vibrations, while the fifth and the sixth ones 25 and 26 are for compensation use.

Figure 10:
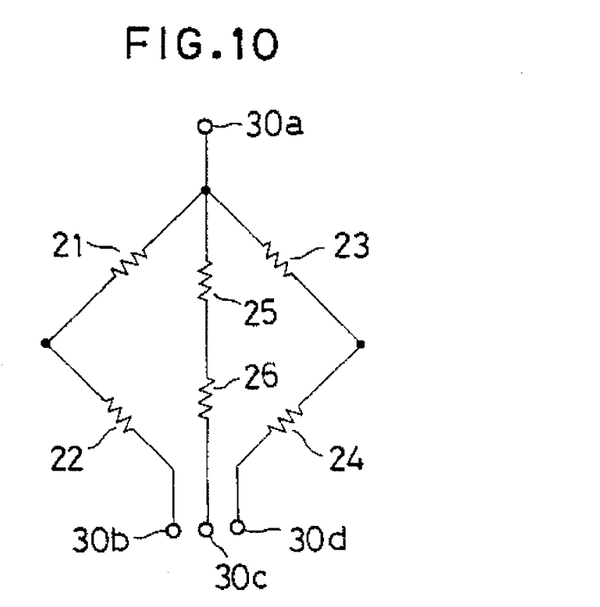
FIG. 10 is an example of a circuit diagram whose characteristics are electrically equivalent to those of the acceleration sensor of the second embodiment of the present invention.

An electrically equivalent circuit of the acceleration sensor of the present invention having the above construction is shown in FIG. 10. In such equivalent circuit, the first and the second piezo-resistance devices 21, 22 are connected in series between the first and the second of the contact pads 30a, 30b, respectively.

Further, the fifth and the sixth piezo-resistance devices 25, 26 are connected in series between the first and the third contact pads 30a, 30c, respectively. And, the third and the fourth piezo-resistance devices 23, 24 are connected in series between the first and the fourth contact pads 30a, 30d, respectively.

Figure 11:
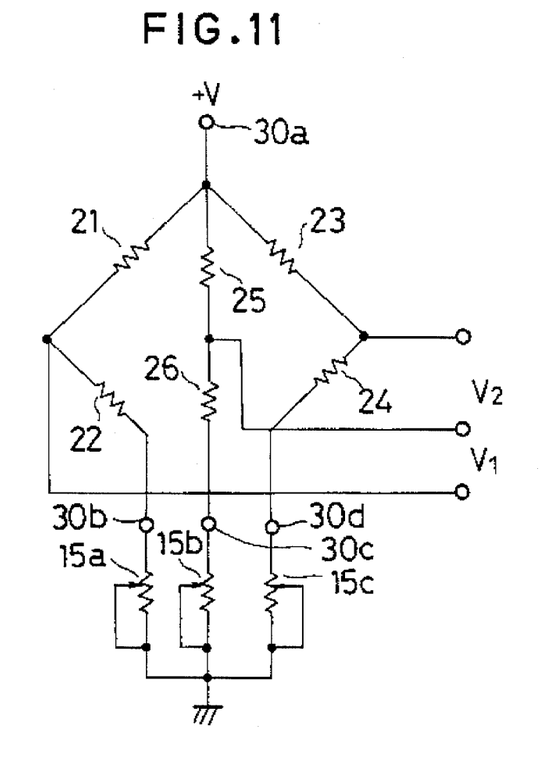
FIG. 11 is another example of the circuit diagram whose characteristics are electrically equivalent to those of the acceleration sensor of the second embodiment of the present invention, illustrating its external connections in practical use.

As shown in FIG. 11 illustrating an example of the equivalent circuit in practice use, a DC voltage V is applied to the first contact pad 30a in a condition in which the second to the fourth contact pads 30b to 30d are grounded through the first, the second and the third variable resistors 15a, 15b, 15c, respectively.

As a result, a first sensor-output or detection signal V1 develops between the junction of the first and the second piezo-resistance devices 21, 22 and the junction of the fifth and the sixth piezo-resistance devices 25, 25. A second sensor-output or detection signal V2 develops between the junction of the third and the fourth piezo-resistance devices 23, 24 and the junction of the fifth and the sixth piezo-resistance devices 25, 25.

Now, the acceleration sensor of the present invention having the above construction will be described in operation in a condition in which the sensor has the central-partition portion 27 disposed vertically.

When the sensor of the present invention is subjected to a vertical one-dimensional acceleration in a direction perpendicular to the paper of FIG. 9, as in the first embodiment of the present invention, the weight portions 8 move in the opposite direction of the acceleration to cause variations in resistance value of the first to the fourth piezo-resistance devices 21 to 24. More specifically, the variations (i.e., former vibrations) in resistance value of the first and the second piezo-resistance devices 21, 22 appear at the second contact pad 30b, while those (i.e., latter vibrations) in resistance value of the third and the fourth piezo-resistance devices 23, 24 appear at the fourth contact pad 30d. In this case, since there is substantially no difference between the displacement of a left one and that of a right one of the weight portions 8, there is substantially no difference in resistance value between the former variations and the latter variations.

When the sensor is subjected to a two-dimensional acceleration, more specifically when the central-partition portion 27 subjected to torque so that the sensor is rotated about the longitudinal axis of the central-partition portion 27, the sensor operates as follows.

More specifically, in FIG. 9, when the sensor has the right half move forward and the left half move backward in a direction perpendicular to the paper of FIG. 9 because of the above two-dimensional acceleration, the sensor operates as follows.

In this case, one of the weight portions 8 (for example, a left one as viewed in FIG. 9) moves forward, while the other of the weight portions 8 moves backward in a direction perpendicular to the paper of FIG. 9 because of the two-dimensional acceleration.

As a result, compressive strains due to compressive stresses applied in the longitudinal directions of the first end the second piezo-resistance devices 21, 22 develop in these devices 21, 22. On the other hand, tensile strains due to tensile stresses applied in the longitudinal directions of the third and the fourth piezo-resistance devices 23, 24 develop in these devices 23, 24.

Consequently, the above-mentioned former variations in resistance value of the first and the second piezo-resistance devices 21, 22 are different in characteristic from the latter variations in resistance value of the third and the fourth piezo-resistance devices 23, 24, which enables the sensor to determine the direction and the magnitude of the torque by comparing the detection signals V1, V2 with the use of an appropriate external circuit.

In the acceleration sensor of the present invention: the support-end portions of the cantilever members, on which the detecting devices are mounted, are firmly supported by the support member; the support-end portions cantilever members are larger in width than the other portions of the cantilever members; whereby the cantilever members are improved so as to be superior in mechanical strength to the conventional cantilever which is constant in width over its entire length, and are also improved in reliability and in construction so as to be simpler than before.

In the sensor of the present invention, since the compensating device which is made of the same materials as those of the detecting means is provided, any separate compensating device is not required in the external circuit. In other words, the sensor of the present invention assures proper compensation without using any separate compensating device in the external circuit.

Further, in the case where both the detecting device and the compensating device are the piezo-resistance devices made of boron-added or boron-implanted silicon with a large amount of boron, it is possible in effect to prevent these devices from being etched by anisotropic etchants such as KOH and the like.

Still further, in the case where the cantilever member has a concave portion in cross section, an effective cross-sectional area of the cantilever member increases. In this case, since the effective cross-sectional area of the cantilever member increases without increasing the thickness of the cantilever member itself, it is possible to improve the sensor both in mechanical strength and sensitivity.

Further, in the present invention, the adjacent opening portions of the frame member are provided with the detecting devices for detecting the direction of two-dimensional acceleration in addition to one-dimensional acceleration. Consequently, in the sensor of the present invention, when the frame member rotates about its central-partition portion because of torque applied to the frame member, the direction of deflection of the cantilever member with respect to the detecting device thereof in one of the opening portions of the frame member is opposite to the direction of deflection of the other cantilever member with respect to the other detecting device thereof in the other of the opening portions of the frame member. Consequently, the detection signal issued from one of the detecting devices because of the former deflection differs in characteristics from that issued from the other of the detecting devices because of the latter deflection, which enables the sensor of the present invention to determine the direction and the magnitude of the two-dimensional acceleration to which the sensor is subjected.

What is claimed is:

1. An acceleration sensor comprising:
   a support frame defining a central opening;
   a vibration detecting device including at least one piezo-resistance device formed of boron-added silicon;
   a compensating device, operatively connected to said vibration detector device, mounted on said support frame and including a piezo-resistance device formed of boron-added silicon;
   a cantilever supporting said detecting device, said cantilever including a first beam and a second beam, said first and second beams each being concave in cross section and having a support end connected to said support frame and a vibratile end extending into said central opening, wherein said support ends are spaced wider apart than said vibratile ends; and
   a weight connected to said vibratile ends of said first and second beams.

2. The acceleration sensor as claimed in claim 1, wherein:
   said support frame is rectangular in shape,
   said first beam is connected to a first corner of said support frame at said support end of said first beam and
   said second beam is connected to a second corner, adjacent to said first corner, of said support frame at said support end of said second beam.

3. The acceleration sensor as claimed in claim 2, a film of SiOxNy is formed on an upper surface of said first and second beams at said supported ends.

4. The acceleration sensor as claimed in claim 2, wherein said vibration detecting device includes first and second piezo-resistance devices provided on a bottom portion of said first and second beams.

5. The acceleration sensor as claimed in claim 4, wherein:
   said vibration detector includes an angled conductor extending along an upper surface of said first and second beams, wherein a first end of said conductor overlays an inner end portion of said first piezo-resistance device and a second end of said conductor overlays an inner end of said second piezo-resistance device; and
   an insulating layer formed on said upper surface of said conductor.

6. The acceleration sensor as claimed in claim 5, further comprising contact through holes provided in said first and second beams, wherein said conductor and said first and second piezo-resistance devices are operatively connected through said holes.

7. The acceleration sensor as claimed in claim 2, wherein said first beam and said second beam have an inverted U-shape in cross section.

8. An acceleration sensor comprising:
   a support frame having first and second openings;
   a central partition separating said first and second openings;
   a first cantilever, having a supported end connected to said support frame and a vibratile end extending into a central portion of said first opening, wherein said first cantilever is concave in cross section and said supported end is wider than said vibratile end;
   a second cantilever having a supported end connected to said support frame and a vibratile end extending into a central portion of said second opening, wherein said second cantilever is concave in cross section and said supported end is wider than said vibratile end;
   a first vibration detecting device carried by said first cantilever and including first and second piezo-resistance devices formed of boron-added silicon;
   a second vibration detecting device carried by said second cantilever and including third and fourth piezo-resistance devices formed of boron-added silicon;
   a compensating device operatively connected to said first and second vibration detecting device and including fifth and sixth piezo-resistance devices formed of boron-added silicon;
   a first weight connected to said vibratile end of said first cantilever; and
   a second weight connected to said vibratile end of said second cantilever.

9. The acceleration sensor as claimed in claim 8, wherein:
   said first cantilever includes a first beam having opposite ends, wherein one end is connected to a first end of said central portion and said opposite end is connected to said first weight, and a second beam having opposite ends, wherein one end is connected to a first end of said central partition and said opposite end is connected to said first weight, and
   said second cantilever including a third beam having opposite ends, wherein one end is connected to a first end of said central partition and said opposite end is connected to said second weight; and further comprising:
   a fourth beam having opposite ends, wherein one end is connected to a second end of said central portion and said opposite end is connected to said second weight.

10. The acceleration sensor as claimed in claim 9, wherein:
    said first vibration detector including a first angled conductor extending along an upper surface of said first and said second beams and operatively connecting said first and second piezo-resistance devices, wherein said first and second beams include though holes which allow contact between said first conductor and said first and second piezo-resistance devices,
    said second vibration detector including a second angled conductor extending along an upper surface of said third and fourth beams and operatively connecting said third and fourth piezo-resistance devices, wherein said third and fourth beams include through holes which allow contact between said second conductor and said third and fourth piezo-resistance devices, and
    Said compensating device including a third linear conductor extending along said central partition and operatively connecting said fifth and sixth piezo-resistance devices.

11. The acceleration sensor as claimed in claim 10, further comprising a thin insulating layer provided on an upper surface of said first and second conductors and a conductor-plated layer on said insulating layer.

12. The acceleration sensor as claimed in claim 9, wherein said beams of said first and second cantilevers have an inverted U-shape in cross section.

13. The acceleration sensor as claimed in claim 12, further comprising a SiOxNy film provided on an upper surface of said frame member, an upper surface of said central partition, and upper surface of said beams.

14. The acceleration sensor as claimed in claim 12, wherein said first through fourth piezo-resistance devices are provided on a bottom surface of said first through fourth beams, respectively.

* * * * *

UNITED STATES PATENT AND TRADEMARK OFFICE
CERTIFICATE OF CORRECTION

PATENT NO. : 5,542,297
DATED : August 6, 1996
INVENTOR(S) : Jun MIZUNO et al.

It is certified that error appears in the above-indentified patent and that said Letters Patent is hereby corrected as shown below:

In column 11, line 48, "detector" has been changed to --detecting device--.

In column 12, line 30, "portion" has been changed to --partition--;

line 32, "first" has been changed to --second--;

line 41, "portion" has been changed to --partition--;

line 45, "detector" has been changed to --detecting device--;

line 50, --angled-- has been inserted before "conductor";

line 52, "detector" has been changed to --detecting device--.

UNITED STATES PATENT AND TRADEMARK OFFICE
CERTIFICATE OF CORRECTION

PATENT NO. : 5,542,297
DATED : Aug. 6, 1996
INVENTOR(S) : Jun Mizuno et al.

It is certified that error appears in the above-indentified patent and that said Letters Patent is hereby corrected as shown below:

In column 13, line 6, "frame member" has been changed to --support frame--.

Signed and Sealed this

Twenty-fifth Day of February, 1997

Attest:

BRUCE LEHMAN

Attesting Officer        Commissioner of Patents and Trademarks